United States Patent
Chen et al.

(10) Patent No.: US 9,784,363 B2
(45) Date of Patent: Oct. 10, 2017

(54) LUBRICATING DEVICE FOR BALL SCREW DEVICE

(71) Applicant: Hiwin Technologies Corp., Taichung (TW)

(72) Inventors: Yih Chyun Chen, Taichung (TW); Wei Ying Chu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 102 days.

(21) Appl. No.: 14/945,642

(22) Filed: Nov. 19, 2015

(65) Prior Publication Data

US 2017/0146114 A1   May 25, 2017

(51) Int. Cl.
*F16H 57/04* (2010.01)
*F16H 25/22* (2006.01)
*F16H 25/20* (2006.01)

(52) U.S. Cl.
CPC ..... *F16H 57/0497* (2013.01); *F16H 25/2204* (2013.01); *F16H 57/045* (2013.01); *F16H 57/0463* (2013.01); *F16H 57/0464* (2013.01); *F16H 2025/2031* (2013.01)

(58) Field of Classification Search
CPC ............ F16H 57/0463; F16H 57/0464; F16H 25/2204
USPC ........................................................ 74/89.44
See application file for complete search history.

(56) References Cited

U.S. PATENT DOCUMENTS

| | | | |
|---|---|---|---|
| 5,782,135 A | 7/1998 | Kondo et al. | |
| 6,015,775 A | 1/2000 | Takayama et al. | |
| 7,234,368 B1 | 6/2007 | Lin et al. | |
| 8,387,474 B2 | 3/2013 | Lin et al. | |
| 8,931,358 B2 * | 1/2015 | Chang | F16H 57/0406 184/19 |

* cited by examiner

*Primary Examiner* — Victor MacArthur
*Assistant Examiner* — Randell J Krug
(74) *Attorney, Agent, or Firm* — Charles E. Baxley

(57) ABSTRACT

A ball screw device includes an elongated shaft having an outer groove, a ball nut having a screw hole for receiving the elongated shaft and having a passage communicating with the screw hole of the ball nut, and a lubricating device includes an oil distributing member engaged into the ball nut and having one end portion engaged into the ball nut for engaging with the groove of the elongated shaft, and a spacing element is attached onto an outer peripheral portion of the distributing member, and the spacing element includes an end portion engaged into the ball nut for engaging with the elongated shaft and for spacing the distributing member from being engaged with the elongated shaft.

8 Claims, 3 Drawing Sheets

LUBRICATING DEVICE FOR BALL SCREW DEVICE

BACKGROUND OF THE INVENTION

1. Field of the Invention

The present invention relates to a ball screw device or motion guide apparatus, and more particularly to a ball screw device including a lubricating device attached to a movable nut member for applying a lubricating grease or oil onto the movable nut member and for suitably lubricating the movable nut member and for allowing the movable nut member to be smoothly moved relative to the elongated shaft.

2. Description of the Prior Art

Typical ball screw devices or linear motion guide apparatuses comprise a movable member, such as a movable nut member rotatably or movably engaged onto the longitudinal screw shaft and movable relative to each other, and a number of ball bearing elements disposed between the movable nut member and the screw shaft for facilitating the sliding movement between the movable nut member and the screw shaft.

For example, U.S. Pat. No. 5,782,135 to Kondo et al. discloses one of the typical ball screw devices comprising a ball nut pivotally or rotatably coupled onto a screw shaft, and a number of loaded ball bearing elements disposed between the screw shaft and the ball nut for facilitating the sliding movement between the screw shaft and the ball nut, and a number of non-loaded balls disposed between the loaded ball bearing elements and made of lubricating materials for suitably lubricating the loaded ball bearing elements and the screw shaft and the ball nut.

However, after use, the non-loaded balls will be worn out and will have a reduced outer diameter such that the gaps between the loaded ball bearing elements will be greatly increased and such that the screw shaft and the ball nut may not be suitably pivoted or rotated relative to each other.

U.S. Pat. No. 6,015,775 to Takayama et al., and U.S. Pat. No. 6,068,931 to Adam et al. disclose two further typical self-lubricating sliding or bearing materials made of specially designed or selected elements for suitably lubricating two movable or rotatable or slidable members.

However, the specially designed or selected elements may greatly increase the manufacturing costs for the sliding or bearing materials.

U.S. Pat. No. 7,234,368 to Lin et al. discloses a further typical ball screw device comprising a ball nut pivotally or rotatably coupled onto a screw shaft, and a number of ball bearing elements disposed between the screw shaft and the ball nut for facilitating the sliding movement between the screw shaft and the ball nut, and one or more guide members engaged in the helical groove portions of the screw shaft and each having an oil retaining member for applying the oil onto the screw shaft.

However, the ball nut should be specially designed and machined for fitting or mounting the guide members such that the manufacturing procedures for the typical ball screw device will be complicated and such that the manufacturing costs for the typical ball screw device will be greatly increased.

U.S. Pat. No. 8,387,474 to Lin et al. discloses a further typical ball screw device comprising a ball nut pivotally or rotatably coupled onto a screw shaft, and a number of ball bearing elements disposed between the screw shaft and the ball nut for facilitating the sliding movement between the screw shaft and the ball nut, and a lubricating device attached to the ball nut for applying a lubricating grease or oil onto the ball nut and for suitably lubricating the movable nut members.

However, the typical screw devices have no suitable structure for effectively supplying or applying the lubricating grease or oil to the screw shaft and the ball nut.

The present invention has arisen to mitigate and/or obviate the afore-described disadvantages of the conventional ball screw devices or motion guide apparatuses.

SUMMARY OF THE INVENTION

The primary objective of the present invention is to provide a ball screw device including a lubricating device attached to a movable nut member for applying a lubricating grease or oil onto the movable nut member and for suitably lubricating the movable nut member and for allowing the movable nut member to be smoothly moved relative to the elongated shaft.

In accordance with one aspect of the invention, there is provided a ball screw device comprising an elongated shaft including a groove formed on an outer peripheral surface thereof, a ball nut including a screw hole formed therein for receiving the elongated shaft, the ball nut including a passage formed therein and communicating with the screw hole of the ball nut, and a lubricating device including an oil distributing member engaged into the passage of the ball nut and including a first end portion engaged into the screw hole of the ball nut for engaging with the groove of the elongated shaft, and a spacing element attached onto an outer peripheral portion of the distributing member, and the spacing element including an end portion engaged into the screw hole of the ball nut for engaging with the groove of the elongated shaft and for spacing the first end portion of the distributing member from being contacted and engaged with the groove of the elongated shaft and arranged for allowing the first end portion of the distributing member to be contacted and engaged with the groove of the elongated shaft after the ball nut has been pivoted or rotated or moved relative to the elongated shaft for a predetermined time interval, such as few seconds or minutes. The spacing element is made of or selected from a wax material or the like.

The lubricating device includes a housing disposed on the elongated shaft and contacted with the ball nut, and the housing includes a chamber formed therein for receiving a lubricating grease, and an inner element is engaged in the chamber of the housing for absorbing the lubricating grease, and the inner element includes a first end portion engaged into the passage of the ball nut and engaged with the distributing member for supplying the lubricating grease to the distributing member, and then to the groove of the elongated shaft. The inner element is made of or selected from a spongy material or the like.

The lubricating device includes an inner cylindrical element having a bore formed in the cylindrical element for receiving the elongated shaft, the cylindrical element includes a first end portion secured to the ball nut and includes a second end portion, and the housing is attached onto the cylindrical element. The lubricating device includes a lock nut engaged onto the cylindrical element and engaged with the housing for anchoring the housing between the ball nut and the lock nut.

The ball nut includes an orifice formed therein and communicating with the passage of the ball nut, and the housing includes a mouth piece engaged into the orifice of the ball nut for anchoring the housing to the ball nut. The first end portion of the inner element is engaged through the mouth piece of the housing and engaged into the passage of the ball nut and contacted with the distributing member. The distributing member is made of or selected from a spongy material or the like.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
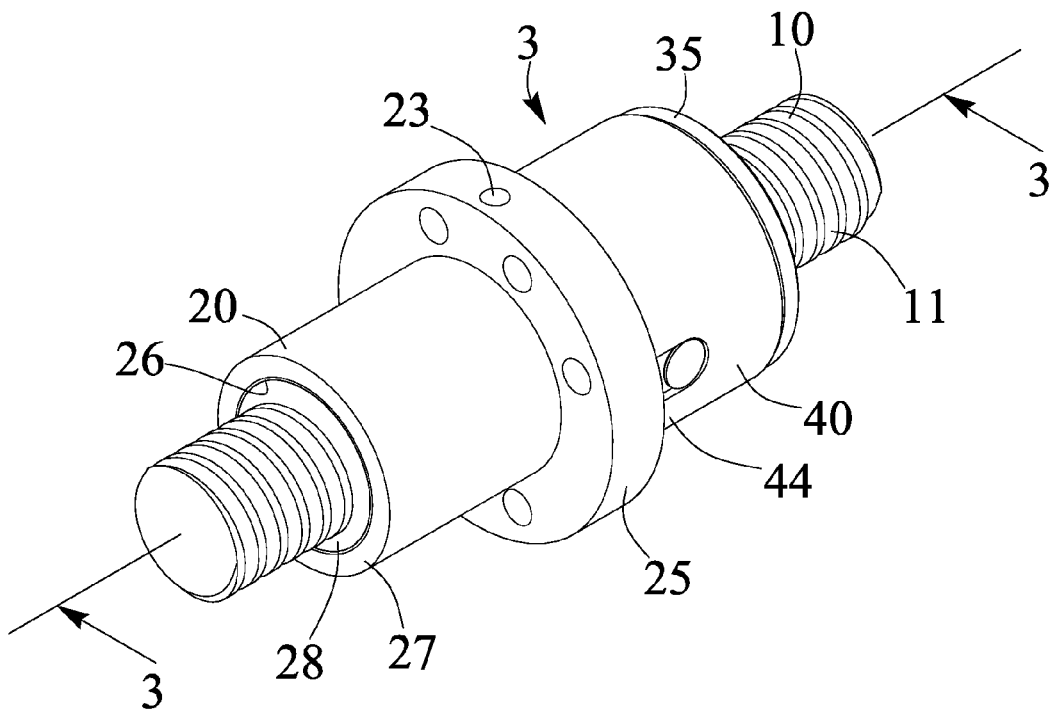
FIG. 1 is a perspective view of a ball screw device in accordance with the present invention.
Figure 2:
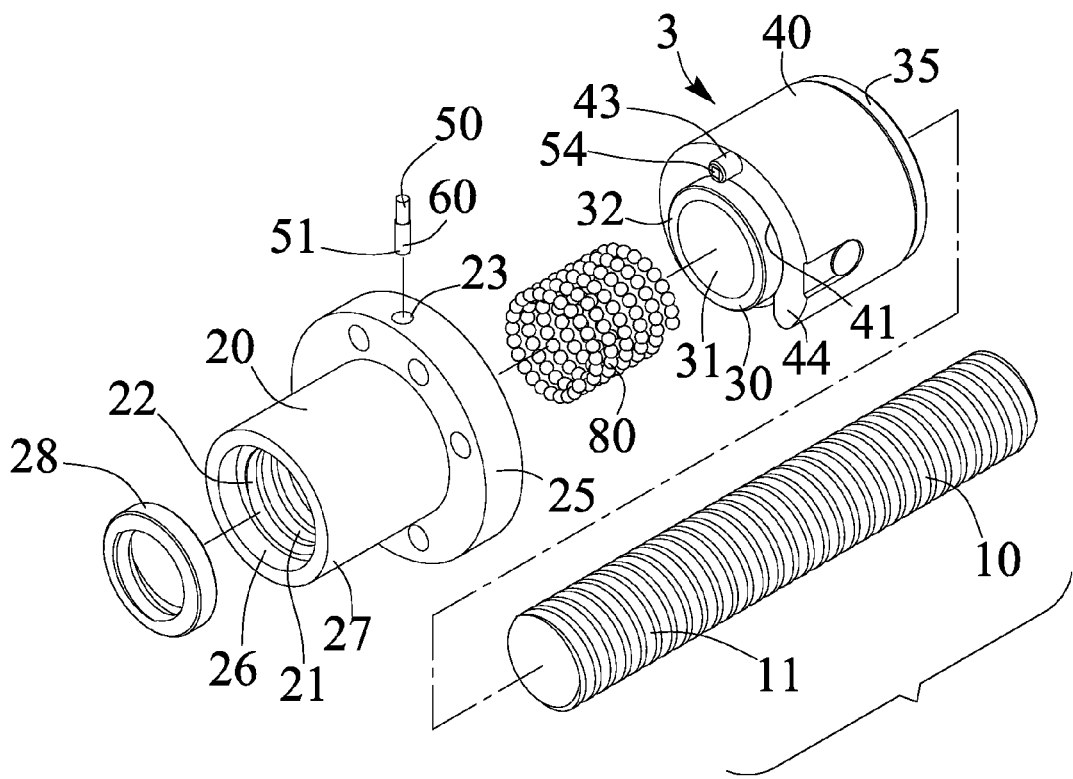
FIG. 2 is an exploded view of the ball screw device.
Figure 3:
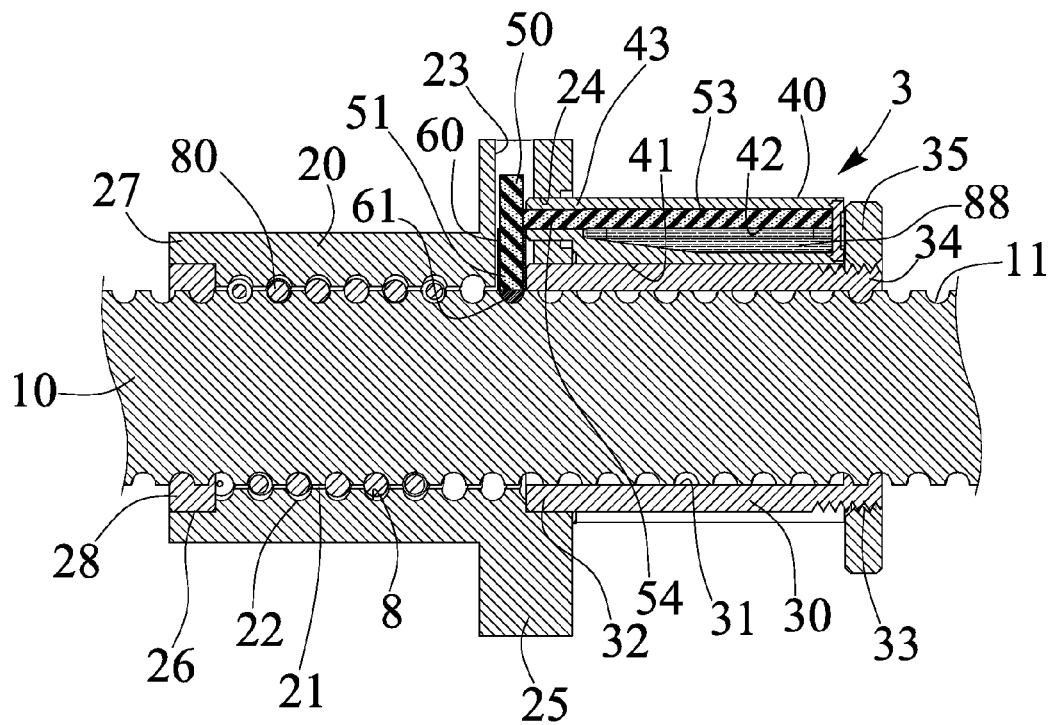
FIG. 3 is a cross sectional view of the ball screw device, taken along lines 3-3 of FIG. 1.

Referring to the drawings, and initially to FIGS. 1-3, a motion guide apparatus, such as a ball screw device in accordance with the present invention comprises an elongated bolt or screw shaft 10 including a number of helical threaded portions or grooves 11 formed on the outer peripheral portion thereof, or formed in the outer peripheral surface thereof, and a movable member, such as a ball nut 20 including a screw hole 21 formed therein and formed or defined by a number of helical threaded portions or grooves 22 for receiving or engaging with the elongated elongated shaft 10, and for threading or engaging with the helical threaded portions or grooves 11 of the elongated shaft 10, and/or for forming one or more endless ball guiding passages 8 in the ball screw device or between the elongated shaft 10 and the ball nut 20 and for slidably receiving a number of ball bearing members 80.

Figure 4:
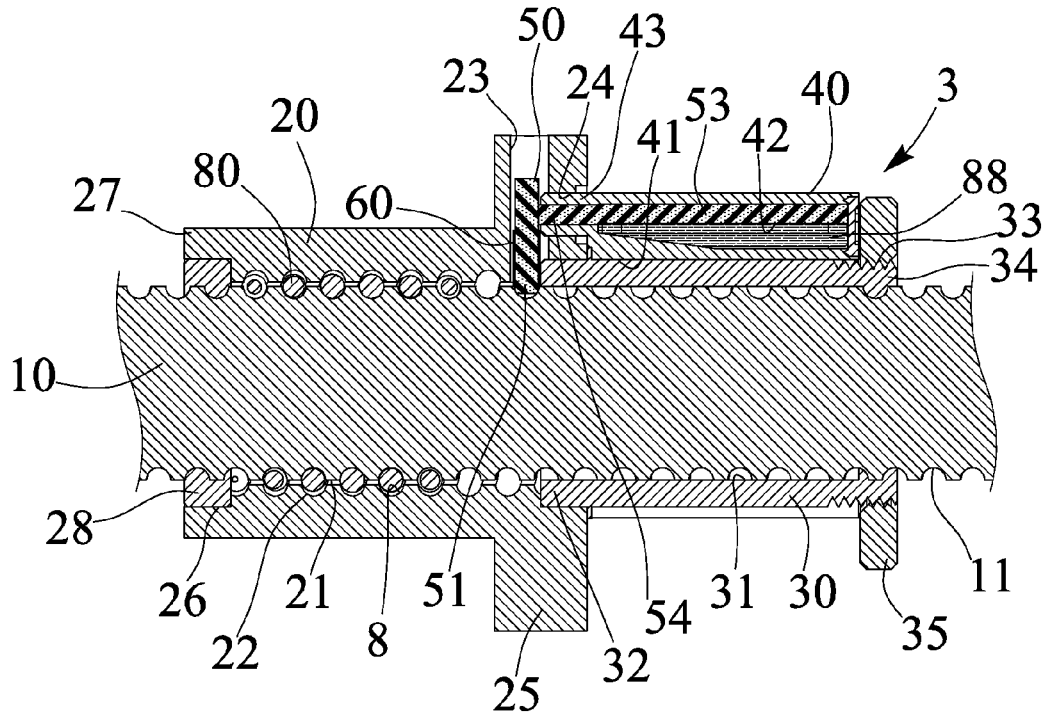
FIG. 4 is another cross sectional view similar to FIG. 3, illustrating the operation of the ball screw device.

The above-described structure is typical and will not be described in further details. The ball nut 20 further includes a conduit or passage 23 formed therein and communicating with the screw hole 21 of the ball nut 20 (FIGS. 3, 4), and further includes a hole or orifice 24 laterally formed therein, such as laterally formed in the one or first end portion 25 thereof and facing or opened and directed away from the ball nut 20 and communicating with the passage 23 of the ball nut 20 (FIGS. 3, 4). The ball nut 20 further includes a depression or recess or space 26 formed therein, such as formed in the other or second end portion 27 thereof for receiving or engaging with an end cap or wiper device 28 or the like and for preventing the dirt or contaminant from entering into the endless ball guiding passages 8 in the ball screw device.

The ball screw device in accordance with the present invention further comprises a lubricating device 3 including an inner cylindrical barrel or element 30 having a bore 31 formed therein for receiving or engaging with the elongated elongated shaft 10, and the cylindrical element 30 includes one or first end portion 32 engaged into the first end portion 25 of the ball nut 20 and solidly and stably secured to the ball nut 20 and moved in concert with the ball nut 20 relative to the elongated shaft 10. The cylindrical element 30 further includes an outer thread 33 formed or provided on the other or second end portion 34 thereof for threading or engaging with a lock nut 35. The lubricating device 3 further includes an outer housing 40 having a substantially cylindrical bore or opening 41 formed therein for receiving or engaging with and for attaching onto the cylindrical element 30 and/or the elongated shaft 10, and for preventing the housing 40 from being disengaged or separated from the cylindrical element 30.

The lock nut 35 is contacted or engaged with the housing 40 for solidly and stably anchoring or retaining the housing 40 between the first end portion 25 of the ball nut 20 and the lock nut 35, or for solidly attaching the housing 40 on the cylindrical element 30. The housing 40 is contacted with the first end portion 25 of the ball nut 20 and includes a compartment or chamber 42 formed therein (FIGS. 3 and 4) for receiving or containing a lubricating oil or grease 88 therein, and includes a stud or mouth piece 43 extended from the one or first end portion 44 thereof and engaged into the orifice 24 in the first end portion 25 of the ball nut 20 (FIGS. 3, 4) for further anchoring or retaining and positioning the housing 40 to the ball nut 20 and for preventing the housing 40 from pivoting or rotating relative to the ball nut 20.

The lubricating device 3 further includes an oil applying or distributing device or member 50 disposed or engaged into the passage 23 of the ball nut 20 (FIGS. 3, 4) and having one or first end portion 51 to be extended or engaged into the screw hole 21 of the ball nut 20 for engaging with the helical grooves 11 of the elongated shaft 10 (FIGS. 4, 6); and further includes an absorbing or outwardly supplying or inner directing element 53 disposed or engaged in the chamber 42 of the housing 40 for absorbing the lubricating grease 88, and the inner element 53 includes one or first end portion 54 engaged in or through the mouth piece 43 of the housing 40 and extended or engaged into the passage 23 of the ball nut 20 (FIGS. 3, 4) and contacted or engaged with the distributing member 50 for supplying the lubricating grease 88 to the distributing member 50, and then to the helical grooves 11 of the elongated shaft 10, and thus for supplying the lubricating grease 88 to lubricate the ball bearing members 80.

The distributing member 50 and the directing element 53 are preferably made of felt or fiber or spongy materials for suitably absorbing the lubricating grease 88 and for suitably introducing or supplying the lubricating grease 88 from the directing element 53 to the distributing member 50 and then to the ball nut 20 and the elongated shaft 10. A spacing layer or element 60 is further provided and applied or attached onto the outer peripheral portion of at least the one or first end portion 51 of the distributing member 50, and the spacing element 60 includes an end portion 61 extended or engaged into the screw hole 21 of the ball nut 20 for engaging with the helical grooves 11 of the elongated shaft 10 (FIGS. 3, 5) and for preventing the first end portion 51 of the distributing member 50 from being contacted and engaged with the helical grooves 11 of the elongated shaft 10. The spacing element 60 is preferably selected from or made of Teflon, wax materials, poly ethylene materials and the like that may be scrubbed and worn out when the ball nut 20 has been pivoted or rotated or moved relative to the elongated shaft 10 for a predetermined time interval, such as few seconds or minutes.

Figure 5:
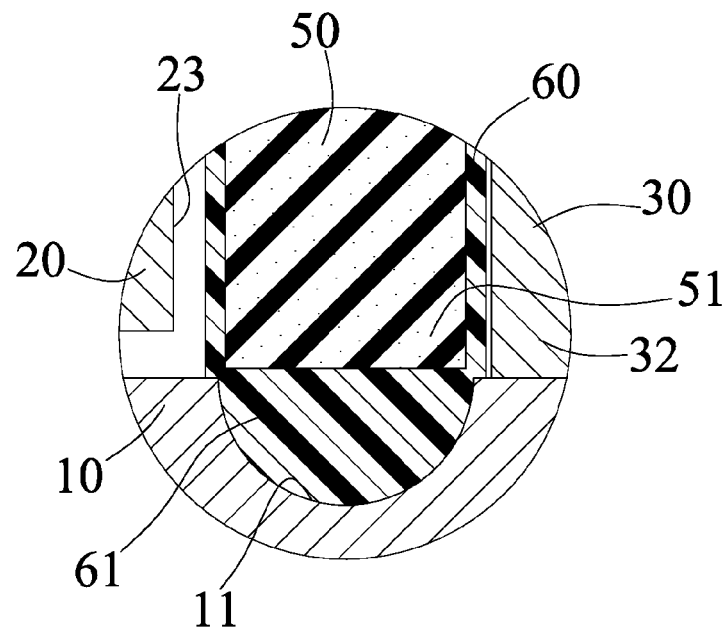
FIGS. 5, 6 are enlarged partial cross sectional views of the ball screw device as shown in FIGS. 3 and 4 respectively.
Figure 6:
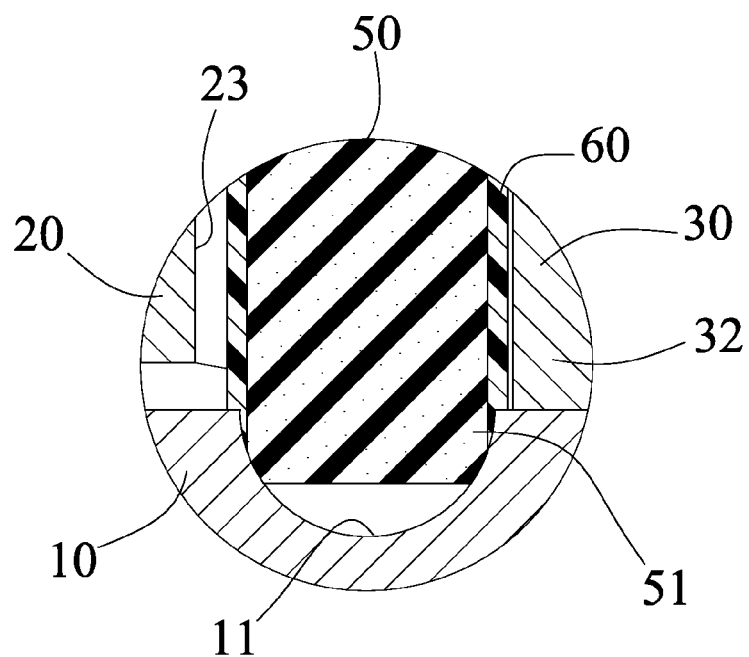

In operation, as shown in FIGS. 3 and 5, the end portion 61 of the spacing element 60 that is extended or engaged into the screw hole 21 of the ball nut 20 may be contacted and engaged with the helical grooves 11 of the elongated shaft 10 and may be scrubbed and worn out after the ball nut 20 has been pivoted or rotated or moved relative to the elongated shaft 10 for a predetermined time interval, such as few seconds or minutes. As shown in FIGS. 4 and 6, after the end portion 61 of the spacing element 60 has been scrubbed and worn out and/or after the ball nut 20 has been pivoted or rotated or moved relative to the elongated shaft 10, the first end portion 51 of the distributing member 50 may be contacted and engaged with the helical grooves 11 of the elongated shaft 10 for suitably introducing or supplying the lubricating grease 88 from the directing element 53 to the distributing member 50 and then to the ball nut 20 and the elongated shaft 10.

It is to be noted that the first end portion 51 of the distributing member 50 may be spaced from the helical grooves 11 of the elongated shaft 10 with the end portion 61 of the spacing element 60 (FIGS. 3 and 5), and may be suitably contacted and engaged with the helical grooves 11 of the elongated shaft 10 (FIGS. 4 and 6) after the end portion 61 of the spacing element 60 has been scrubbed and worn out and/or after the ball nut 20 has been pivoted or rotated or moved relative to the elongated shaft 10 for a predetermined time interval. It is further to be noted that, when the ball nut 20 and the elongated shaft 10 are not moved relative to each other, the lubricating grease 88 may also be continuously supplied from the directing element 53 to the distributing member 50 and then to the ball nut 20 and the elongated shaft 10 if the first end portion 51 of the distributing member 50 is not covered or shielded or blocked by or with the spacing element 60.

Accordingly, the ball screw device in accordance with the present invention includes a lubricating device attached to a movable nut member for applying a lubricating grease or oil onto the movable nut member and for suitably lubricating the movable nut member and for allowing the movable nut member to be smoothly moved relative to the elongated shaft.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
   an elongated shaft including a groove formed on an outer peripheral surface thereof,
   a ball nut including a screw hole formed therein for receiving said elongated shaft, said ball nut including a passage formed therein and communicating with said screw hole of said ball nut, and
   a lubricating device including:
   an oil distributing member engaged into said passage of said ball nut and including a first end portion engaged into said screw hole of said ball nut for engaging with said groove of said elongated shaft, and
   a spacing element attached onto an outer peripheral portion of said distributing member, and said spacing element including an end portion engaged into said screw hole of said ball nut for engaging with said groove of said elongated shaft and for spacing said first end portion of said distributing member from being contacted and engaged with said groove of said elongated shaft, and said spacing element being selected from Teflon, wax materials, or poly ethylene materials for being scrubbed and worn out when said ball nut is rotated and moved relative to said elongated shaft, and for allowing said first end portion of said distributing member to be contacted and engaged with said groove of said elongated shaft after said end portion of said spacing element has been scrubbed and worn out.

2. The ball screw device as claimed in claim 1, wherein said lubricating device includes a housing disposed on said elongated shaft and contacted with said ball nut, and said housing includes a chamber formed therein for receiving a lubricating grease, and an inner element is engaged in said chamber of said housing for absorbing said lubricating grease, and said inner element includes a first end portion engaged into said passage of said ball nut and engaged with said distributing member for supplying said lubricating grease to said distributing member, and then to said groove of said elongated shaft.

3. The ball screw device as claimed in claim 2, wherein said lubricating device includes an inner cylindrical element having a bore formed in said cylindrical element for receiving said elongated shaft, said cylindrical element includes a first end portion secured to said ball nut and includes a second end portion, and said housing is attached onto said cylindrical element.

4. The ball screw device as claimed in claim 2, wherein said ball nut includes an orifice formed therein and communicating with said passage of said ball nut, and said housing includes a mouth piece engaged into said orifice of said ball nut for anchoring said housing to said ball nut.

5. The ball screw device as claimed in claim 4, wherein said first end portion of said inner element is engaged through said mouth piece of said housing and engaged into said passage of said ball nut and contacted with said distributing member.

6. The ball screw device as claimed in claim 2, wherein said inner element is selected from a spongy material.

7. The ball screw device as claimed in claim 1, wherein said lubricating device includes a lock nut engaged onto said cylindrical element and engaged with said housing for anchoring said housing between said ball nut and said lock nut.

8. The ball screw device as claimed in claim 1, wherein said oil distributing member is selected from a spongy material.

* * * * *